United States Patent [19]
Catanzaro et al.

[11] Patent Number: 5,929,583
[45] Date of Patent: Jul. 27, 1999

[54] METHOD AND APPARATUS FOR DETECTING ABERRANT MOTOR OPERATION IN A PLASTICS PROCESSING MACHINE

[75] Inventors: John C. Catanzaro, Lebanon; James E. O'Bryan, Cincinnati, both of Ohio

[73] Assignee: Cincinnati Milacron Inc., Cincinnati, Ohio

[21] Appl. No.: 09/042,272

[22] Filed: Mar. 13, 1998

[51] Int. Cl.$^6$ ....................................................... H02P 5/46
[52] U.S. Cl. ........................... 318/565; 318/625; 318/626; 318/661
[58] Field of Search ..................................... 318/563, 565, 318/575, 591, 618, 625, 626, 661

[56] References Cited

U.S. PATENT DOCUMENTS

| | | | |
|---|---|---|---|
| 3,564,337 | 2/1971 | Macgeorge | 318/434 X |
| 3,931,557 | 1/1976 | Osburn | 318/434 |
| 4,266,375 | 5/1981 | Nishimura et al. | 451/5 |
| 4,540,359 | 9/1985 | Yamazaki | 425/547 |
| 4,719,995 | 1/1988 | Ikejima | 187/296 |
| 4,785,221 | 11/1988 | Neko | 318/311 |
| 4,826,418 | 5/1989 | Kamiguchi | 425/136 |
| 4,828,473 | 5/1989 | Otake et al. | 425/145 |
| 4,846,654 | 7/1989 | Neko | 425/150 |
| 4,847,779 | 7/1989 | Masao et al | 364/476 |
| 4,851,171 | 7/1989 | Shimizu et al. | 264/40.5 |
| 4,881,186 | 11/1989 | Tsuboi et al. | 364/565 |
| 4,988,273 | 1/1991 | Faig et al. | 425/145 |
| 5,002,708 | 3/1991 | Inaba et al. | 264/40.1 |
| 5,153,149 | 10/1992 | Naito et al. | 425/136 |
| 5,246,643 | 9/1993 | Inaba et al. | 264/40.1 |
| 5,362,222 | 11/1994 | Faig et al. | 425/145 |
| 5,380,181 | 1/1995 | Hiroaka et al. | 425/145 |
| 5,445,773 | 8/1995 | Arai | 264/40.1 |
| 5,469,038 | 11/1995 | Silvey | 318/632 |

*Primary Examiner*—Bentsuo Ro
*Attorney, Agent, or Firm*—Stephen H. Friskney

[57] ABSTRACT

A method and apparatus for detecting an aberrant velocity of a motor used to drive an element in a plastics processing machine, such as an injection molding machine, for example. The velocity of the motor is detected by a first sensor and a machine parameter associated with the machine operation is provided. A velocity limit is determined based upon the machine parameter and an error signal is generated when the motor velocity exceeds the velocity limit by more than a predetermined tolerance value. Preferably, the machine parameter comprises the position of the element driven by the motor, which is sensed by a sensor, such as a linear displacement transducer. The velocity limit can be based upon this measured element position as well as data entered for the particular machine, such as a minimum element position, a maximum element position, and a maximum motor velocity, such that a desired motor operating envelope is defined. Also, the motor velocity command is preferably set equal to the velocity limit when it exceeds the limit. In another embodiment, the machine parameter comprises a motor velocity command for controlling the velocity of the motor. The velocity command is compared to the previous velocity command and the velocity limit is set equal to the velocity command when it exceeds the previous command.

24 Claims, 7 Drawing Sheets

METHOD AND APPARATUS FOR DETECTING ABERRANT MOTOR OPERATION IN A PLASTICS PROCESSING MACHINE

BACKGROUND OF THE INVENTION

1. Field of the Invention

The present invention relates to the control of electric motors and, more particularly, to a method and apparatus for detecting aberrant operating conditions of electric motors used in the drive systems of injection molding machines, and for deactivating such motors when the aberrant conditions are detected.

2. Description of the Related Art

Various electrical and mechanical devices are commonly used in conjunction with an electric motor so that the motor produces the desired effect for the particular application. However, these electrical and mechanical devices can sometimes malfunction causing the motor to produce an erroneous result. For example, one such error occurs when the motor is not properly connected to the machine element which is driven by the motor. The motor is connected to the driven elements by various mechanical connecting devices such as drive belts and pulleys; if any of these devices are loose or broken, or if the driven element is damaged, the machine will not function properly.

Another error which can occur in machines utilizing electric motors involves the various measurement devices used in the machines. For example, a linear position device, such as a linear displacement transducer, can be used to measure the position of the axis, and a resolver can be used to measure the angular position and/or velocity of the motor shaft. If either of these devices is loose or broken, the machine will not produce the desired response.

In addition, the software and electrical and mechanical control devices that control the machine may be faulty, thereby causing a malfunction. Furthermore, the operator of the machine may provide erroneous inputs to the machine, which, if undetected, can cause undesirable results.

Such erroneous conditions can be particularly problematic in an injection molding machine. In electrically driven injection molding machines, there may be as many as three or more electric motors used to drive machine elements for the various operating axes of the machine. For example, an electro-mechanically driven injection molding machine would likely have separate electric motors to power the clamp, the injection platen, and the ejection plate. If any of the above-noted faulty conditions occur, inconsistent molding machine performance, and even damage to the machine, can result. For example, a faulty electric motor in an injection molding machine might exceed its programmed velocity ("runaway") and cause the machine elements of the associated machine axis to interfere with or "crash" into another part in the machine, thereby causing potentially significant damage to machine components and, perhaps, the motor itself. Moreover, the molding machine would be unavailable for use while it is being repaired, thereby increasing the damage caused by the "runaway" motor.

It has been known to use limit switches in injection molding machines to prevent some malfunctions. Limit switches can detect when an axis is driven past a particular point beyond which it should not be permitted to go, and can shut off the motor accordingly. However, while limit switches can prevent some machine failures, they are not without disadvantages. First, they can only detect errors in axis position and not errors in motor velocity. Accordingly, even though the limit switch will shut off the motor if the axis is driven past the critical points, often times the motor will still be running at an unacceptably high speed, and the axis will proceed to "crash" even though the limit switch has been tripped. Second, limit switches cannot verify that the measured axis position is correct, but merely detect whether the axis has been driven beyond its predetermined maximum and minimum stroke positions. Thus, limit switches cannot really monitor machine operation on a continuing basis to detect errors in motor speed and/or machine axis position and, accordingly, often cannot prevent machine damage and malfunction.

Thus, there remains a need for an improved control system which continually monitors the machine for aberrant operating conditions and which can shut down the faulty drive and/or the machine as soon as the aberrant condition is detected. More specifically, there is a need to monitor the machine for errors in the position of machine elements, to verify that machine elements are at their expected location and operating within predetermined limits, such that motor drive coupling faults, erroneous sensing devices, and other malfunctions can be detected. Moreover, it is desired to monitor the machine continually for errors in motor velocity as defined by a velocity operating envelope, so that damage and poor performance can be prevented. It is also desirable to allow for changes in the velocity operating envelope with respect to axis position and/or velocity command signals, so that optimal motor control can be achieved.

SUMMARY OF THE INVENTION

Accordingly, it is an object of the present invention to obviate the above-described problems associated with machine elements driven by an electric motor.

It is another object of the present invention to provide a method and apparatus which prevents faulty or poor performance of an injection molding machine.

Another object of the invention is to prevent machine axis "crashes", motor "runaway", and other machine malfunctions, thereby reducing the damage and expense that can be caused by such conditions.

Yet another object of the invention is to overcome the disadvantages of using limit switches to control aberrant operating conditions of motor driven systems.

It is another object of this invention to monitor continually the drive systems of plastics processing machines, such as injection molding machines, to facilitate prevention of improper performance and machine failures.

Additional objects, advantages, and other novel features of this invention will be set forth in part in the description that follows.

To achieve the foregoing and other objects, and in accordance with the purposes of the present invention as described above, a method and apparatus for detecting an aberrant velocity of a motor used to drive an element in a plastics processing machine, such as an injection molding machine, for example, are provided. The velocity of the motor is detected by a first sensor and a machine parameter associated with the machine operation driven by the motor is identified. A velocity limit is determined based upon the machine parameter and an error signal is generated when the detected motor velocity exceeds the velocity limit by more than a predetermined tolerance value. Preferably, the machine parameter comprises the position of a machine element driven by the motor, which is sensed by a sensor, such as a linear displacement transducer. The velocity limit can be based upon this measured position of the machine element, as well as data entered for the particular machine, such as a minimum element position, a maximum element position, and a maximum motor velocity, such that a desired motor operating envelope is defined. Also, the motor velocity command is preferably set equal to the velocity limit when it exceeds the limit. In another embodiment, the machine parameter comprises a motor velocity command for controlling the velocity of the motor. The velocity command is compared to the previous velocity command and the velocity limit is set equal to the velocity command when it exceeds the previous command.

Still other objects of the present invention will become apparent to those skilled in this art from the following description, wherein, there are shown and described preferred embodiments of this invention, simply for purposes of illustration. As will be realized, the invention may take on other aspects and arrangements than those described in detail below without departing from the scope of the invention as defined by the claims.

BRIEF DESCRIPTION OF THE DRAWINGS

While the specification concludes with claims particularly pointing out and distinctly claiming the invention, it is believed that the invention will be better understood from the following description taken in conjunction with the accompanying drawings in which:

DETAILED DESCRIPTION OF THE PREFERRED EMBODIMENT

Although the present invention is applicable to a variety of plastics processing machines having various types of motors, for purposes of illustration, the following description is presented in connection with an injection molding machine driven by electric motors. Accordingly, a description of this type of machine is presented solely for better understanding of the present invention and should not be viewed as a limitation of its applicability, scope or advantages.

Figure 1:
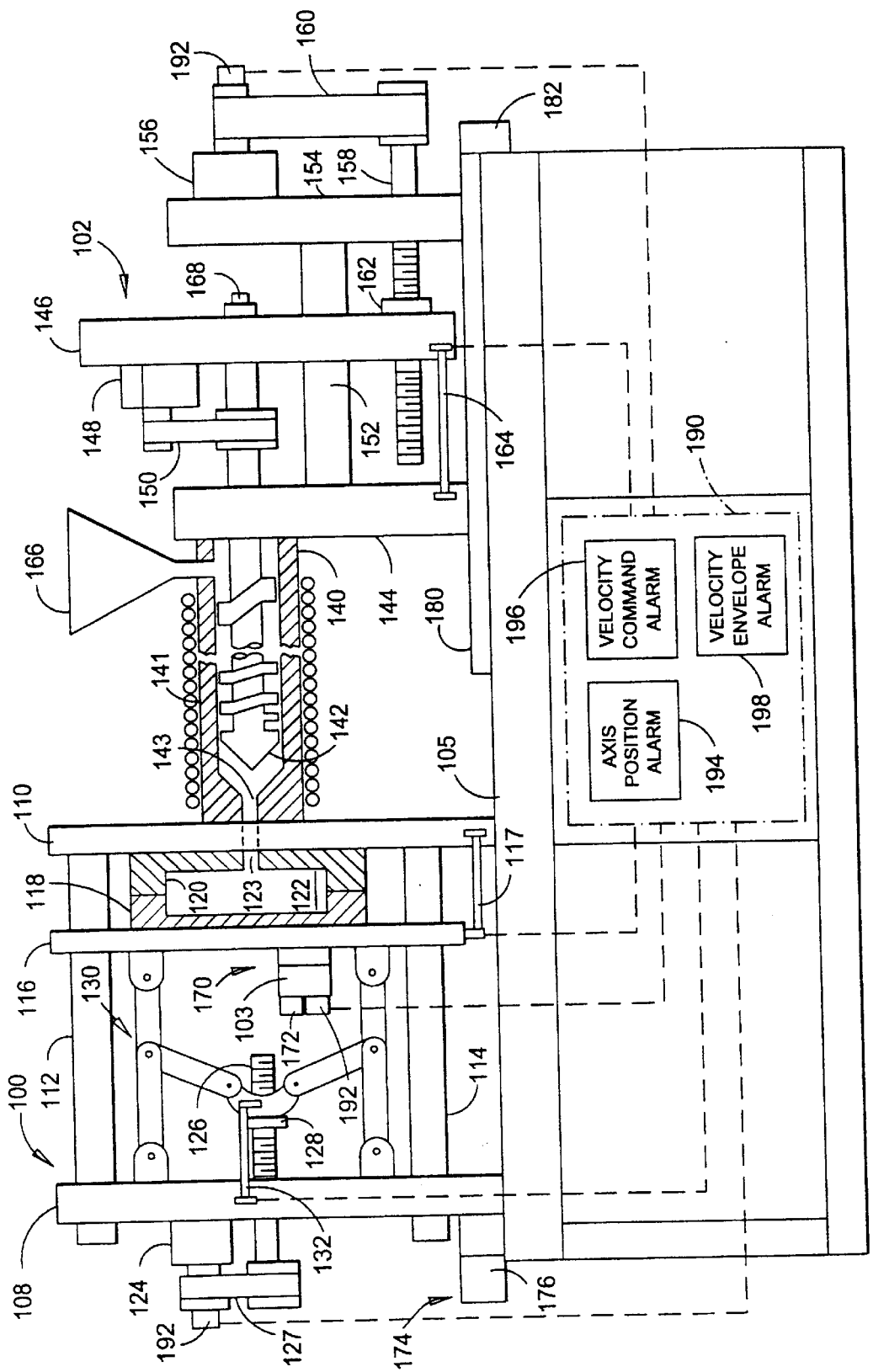
FIG. 1 is a diagrammatic, side view of an injection molding machine in combination with a machine control for controlling the molding machine according to one aspect of the present invention.

FIG. 1 illustrates a relatively conventional all-electric injection molding machine to which the method of the present invention can be applied. The machine comprises a clamp unit 100 and an injection unit 102, with each unit being mounted on a base 105.

The clamp unit 100 comprises rectangular stationary platen 110 and die height platen 108 (which is also stationary during normal machine operation). The two platens 108, 110 are connected by four tie bars at the platen corners, two of the tie bars 112, 114 being shown in FIG. 1. The tie bars operate as guides for a moveable platen 116 to which mold half 118 is affixed. The second mold half 120 is fixed to the stationary platen 110. When the clamp unit 100 is in the closed position as shown, a mold cavity 122 is formed between the mold halves 118 and 120. A gate opening 123 passes through the mold half 120 and the stationary platen 110 in order to permit the injection of a plastic melt into the mold cavity 122. The moving platen 116 is operated by an electric clamp motor 124 which is mounted on the stationary platen 108. The motor 124 is connected to a ball screw 126 by a drive belt 127. Engaged with the ball screw 126 is a ball nut 128 which is connected to a toggle mechanism 130 to enable operation of the clamp unit 100 by the motor 124.

The injection unit 102 includes an extruder mechanism comprised of a tubular barrel 140 with an extruder screw 142 rotationally and translationally mounted therein. The driven end of screw 142 passes through a bore in a stationary member 144 and is rotatably supported by a moveable injection platen 146. Rotation of the screw 142 is accomplished by an electric extruder motor 148 which is illustrated as being coupled to the screw by a drive belt 150. The moveable platen 146 rides on a pair of parallel bar guides, one of which is shown at element 152, which are connected between the stationary members 144 and 154. An electric injection motor 156 is mounted on the member 154 and is connected to a ball screw 158 by a drive belt 160. A ball nut 162 is mounted in the moveable platen 146 and engages the ball screw 158, thereby allowing the motor 156 to impart linear motion to the platen 146 and the extruder screw 142 toward and away from the stationary platen 110.

As also shown in FIG. 1, an ejector unit 170 is associated with the mold and is operative to eject the finished molded part when the mold opens. The ejector unit 170 includes an ejector plate (not shown) that is driven by a ball screw mechanism (not shown) coupled to an ejector motor 103. A die height unit 174 operates in association with the tie bars and platen 108 shown in FIG. 1 to provide selective adjustment of the spacing of platen 108 relative to the stationary platen 110 to accommodate different mold sizes (i.e., different mold thicknesses). A die height motor 176 drives the die height unit 174 and is typically be manually operated during initial set-up of the injection molding machine.

An injection sled 180 preferably rides on tracks (not shown) on the base 105 and supports the entire injection unit 102, thereby permitting the injection unit to move relative the stationary platen 110, as required. The injection sled is mechanically coupled to a sled motor 182 which can also be manually controlled by the operator of the injection molding machine. It should be understood that the various motors described above could be AC induction motors, brushed AC or DC motors, brushless AC or DC motors (such as are described in U.S. Pat. No. 4,988,273, the entire disclosure of which is hereby incorporated herein by reference), or other type of motor as might be best suited for the particular application of the machine.

A cycle of operation will now be briefly described, starting with the clamp unit 100 being in the closed position (as shown in FIG. 1) with a full force (tonnage) applied to the mold. At this point in time, material from the hopper 166 will have been plasticized by rotation of the screw 142 and by the heat provided from the heater bands 141 surrounding the barrel 140, resulting in a quantity of liquid phase plastic melt or a "shot" in front of the screw. To begin the injection sequence, a machine control 190 provides a velocity command to the motor 156 in order to move the injection platen 146 linearly, causing the screw 142 to move forward (towards the platen 110). As the screw 142 moves linearly in the barrel 140 toward the stationary platen 110, the plastic melt is injected through the orifice 143 and gate opening 123 into the mold cavity 122. When the screw 142 completes its linear motion, the machine control 190 transfers to the pack interval, during which the extruder motor 148 is provided with a zero velocity signal from the machine control 190 to keep the extruder screw 142 from being counter rotated due to back pressure of the melt. In the pack interval the injection of plastic melt into the mold is completed. This process typically includes pressure control from the machine control 190.

At the end of predetermined period of time, marking the end of the pack interval, the machine control 190 transfers to the hold interval, wherein the injection pressure is maintained. The pack and hold intervals require that the injection motor 156 maintain a relatively high torque (using high current) with little or no rotation.

At the end of the hold interval, the machine control 190 transfer to a cooling interval for a further period of time while the molded part cools or cures. During the cooling interval, the machine control initiates an extruder run, in which the extruder motor 148 is activated to rotate the screw 142 and thereby extrude a new shot of molten material to the front of the screw 142. At the same time, the injection motor 156 must be operated to move the screw 142 away from the platen 110 while maintaining a predetermined pressure on the molten plastic material, i.e., a predetermined back pressure on the extruder screw 142. To achieve this, the machine control 190 causes the extruder motor 148 to rotate the screw to plasticize more plastic material and convey it to the front of the screw adjacent to the orifice 153, thereby generating a back pressure which is controlled to a preset level. Back pressure is maintained at the desired level by the machine control 190 while the motor 156 rotates the ball screw 158 moving the feed screw 142 away from the platen 110. Accordingly, as the screw 142 rotates to build a shot of molten plastic, it will be moved away from the platen 110 at a controlled back pressure until the full shot of plastic material is generated and the screw 142 is moved to its rearward "injection" position.

When the screw 142 reaches its predetermined injection position, the machine control 190 stops the operation of the extruder motor 148 and issues a velocity command to the drive control for the injection motor 156 to move the screw further back thereby relieving the pressure on the molten plastic material due to the back pressure from the screw. This step is generally known as the decompression step.

At the end of the cooling interval, the machine control 190 also provides a velocity command to the clamp motor 124 to shift the moveable platen 116 in the direction away from the stationary platen 110 to open the mold by opening the clamp unit 100. While the clamp 100 is opening, the machine control 190 will provide command signals to the ejector unit 170 and ejector motor 103 to actuate the mold part ejector mechanism (not shown) carried by the mold half 118 to eject the finished part from the mold then returns the part ejector mechanism to its original position.

The machine control then begins the clamp close sequence by giving command signals to initiate movement of the platen 116 in the opposite direction to bring the mold halves back together. This is achieved by generating a velocity command to close the clamp rapidly, bringing the mold halves 118, 120 toward their closed position.

When the moveable platen 116 has reached a predetermined position, the machine control 190 reduces the velocity command until a second predetermined position is detected where the mold halves come into contact. (The lower velocity command helps to protect the mold halves from being slammed together.) Once the mold has reached the fully closed position, the torque command value from the machine control 190 is increased, such that the toggle mechanism 130 is moved to a lock-over position building the required tonnage (force) to hold the mold closed for injection during the next molding cycle.

Accordingly, a number of electric motors are used to drive the various machine axes of the injection molding machine shown in FIG. 1. The present invention is equally applicable to similar drive systems that are employed in other types of plastics processing machines. In any of these machines, a "runaway" motor which exceeds a given velocity for a given amount of time will likely result in unsatisfactory performance, and may even cause damage to the machine. In addition, improper connection of the motor to the driven elements of a machine axis can result in errors and damage. Furthermore, the various sensors that measure motor speed and position, as well as sensors that measure position of machine elements can cause errors in processing and damage to the machine.

Accordingly, in addition to providing conventional injection molding control, such as described in U.S. Pat. Nos. 5,362,222 and 5,469,038 (the entire disclosures of which are hereby incorporated herein by reference), the present invention provides machine control that includes three additional monitors to detect aberrant operating conditions that can result from sensor problems, motor coupling problems and motor runaway problems, thereby preventing crashes and other undesirable results.

As shown in the machine of FIG. 1, the clamp motor 124, the ejector motor 103, and the injection motor 156 are fitted with induction resolvers 192 for measuring the rotary position of each motor at successive points in time. Alternatively, other measurement devices can be used besides the resolvers 192 to monitor critical data, such as the velocity and/or rotary position of the motors. For example, pulse encoders, tachogenerators, or Hall effect sensors may be used instead of the resolvers 192.

Various machine elements of the axes driven by these motors are likewise fitted with position sensors for measuring the respective position of the machine element associated with a particular axis. For example, as shown in FIG. 1, the moveable platen 116 can be fitted with a linear position transducer 117 for sensing the position of the platen 116 relative to stationary platen 110. Likewise, the position of the clamp toggle mechanism 130 is measured by the linear position transducer 132, the position of the injection platen 146 is detected by the position transducer 164 and the position of the ejector plate (not shown) in the ejector unit 170 is indicated by a transducer 172. If desired, other types of measurement devices can be used instead of the transducers 117, 132, 164 and 172, such as linear potentiometers and Hall effect devices, depending on the particular elements to be monitored with respect to a particular axis.

According to the present invention, the machine control 190 includes an axis position alarm system 194, a velocity command alarm system 196, and a velocity envelope alarm system 198, which monitor the motor position and axis position signals provided by the various sensors to continually verify proper machine operation. As more fully described below, the axis position alarm 194 verifies that the measured position of an element of the relevant axis coincides with the expected position of the element for that axis, as determined by the measured angular position of the motor. The velocity command alarm 196 verifies that the motor velocity is not above a maximum velocity limit, which may change in accordance with command signals sent to the motor. The velocity envelope alarm 198 ensures that the motor velocity is not above a second maximum velocity limit which may change depending upon where the monitored machine element is located along the driven axis at any given point in time.

Figure 2:
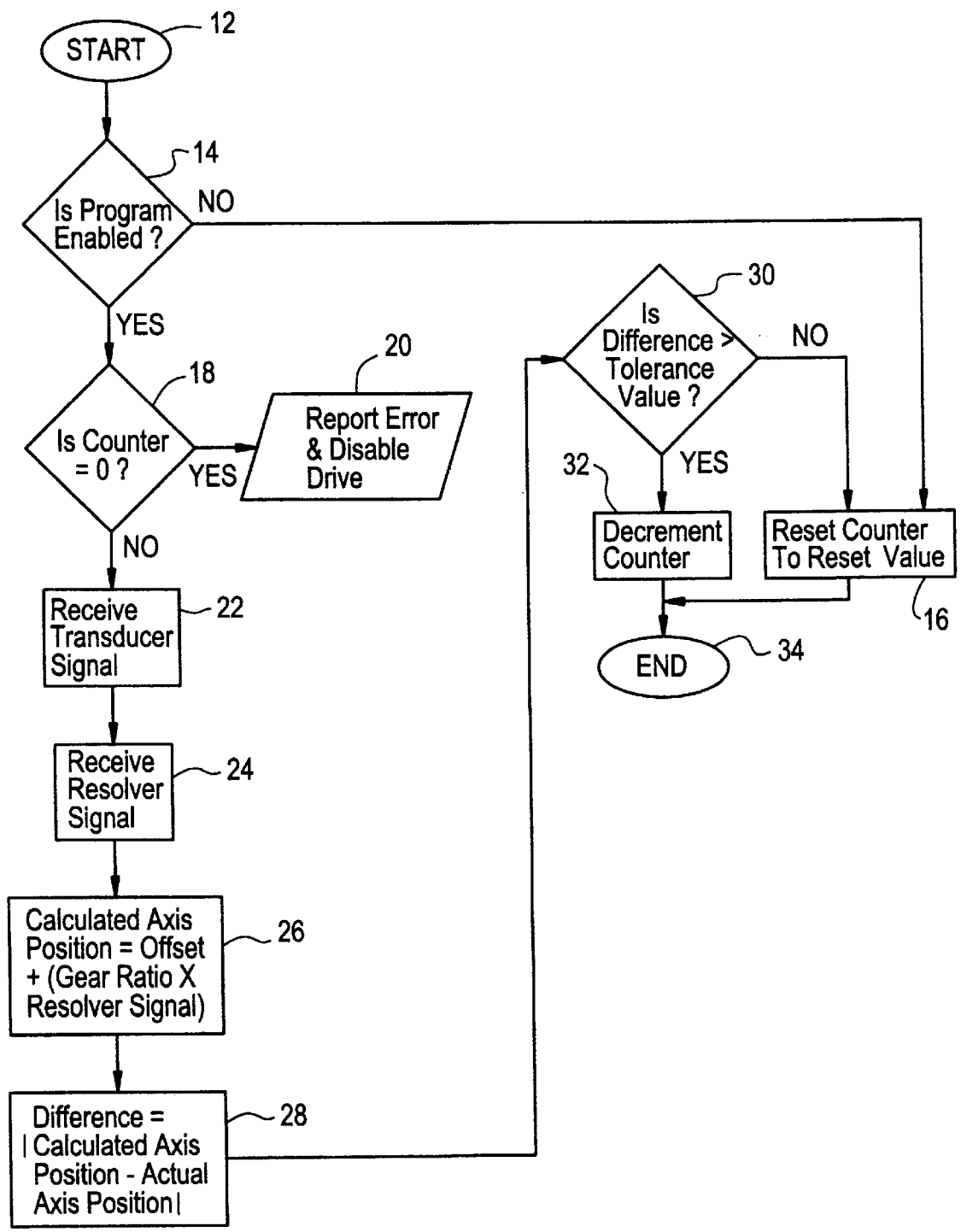
FIG. 2 is a flow diagram illustrating a method for verifying the position of an element of an axis driven by a motor and reporting an error condition when the position is in error, according to another aspect of the present invention.

FIG. 2 is a flow diagram illustrating the preferred operation of the axis position alarm system 194; as shown, the method is initiated at step 12. Preferably, the method is executed periodically during the operation of the machine so that continual monitoring of this aspect of machine operation is achieved. For example, the method could be executed once every millisecond during machine operation.

Once the method is initiated, it is determined whether the system is enabled at step 14. This step can be achieved by determining whether a certain user-definable variable (or register) has been set equal to zero. For example, if the counter reset value (also known as the check rate) is set equal to zero by the user, then the program will be considered deactivated and step 16 will be executed thereby resetting the counter to a preset value and ending the method. However, whenever the user changes this particular variable to a non-zero number, the method will then continue from step 14 to step 18.

At step 18, it is determined whether the counter has reached zero. If the counter has not yet reached zero, step 22 is executed, wherein the transducer signal is received from the axis being monitored by the program. For example, in the exemplary application of FIG. 1, if the clamp toggle mechanism 130 is being monitored, the transducer 132 would provide the linear position of the ball nut 128 in the toggle mechanism. Likewise, the transducer 164 will provide the position of the injection platen 146, the transducer 117 will provide the position of moving platen 116, and the transducer 172 will provide the position of the ejector plate (not shown). As known in the art, the signals provided by these transducers indicate the linear position of the particular axis to which the transducer is connected. An analog to digital converter (ADC) can be used to convert an analog transducer output to a digital signal for use in a digital processing device. Alternatively, other sensing devices can be used which inherently provide a digital signal, making the ADC unnecessary. In either case, the digital signal is provided to the method of FIG. 2 at step 22, such as by being stored in a register.

Step 24 is then executed wherein the resolver signal is received from the resolver on the motor shaft. As known in the art, a resolver, such as an induction resolver, can provide an analog feedback signal which indicates the angular position of the rotating motor shaft. The signal is converted by an ADC so that the position can be provided in terms of two numbers, one indicating the number of full revolutions that the motor has turned, and another indicating the position of the motor in the presently occurring revolution. For example, if the motor has made 4.5 revolutions, a resolver having a resolution of 32,767 bits per revolution will provide the number 4 (indicating the number of full revolutions of the motor) and the number 16,384 (indicating the position of the motor in the presently occurring revolution). These numbers correspond to a total rotation value of 147,452 bits.

This total rotation value can be then used (at step 26) to calculate a linear position of the driven element, based upon the gearing ratio of the connections between the motor and the driven element of the machine axis. If the gearing ratio is given in terms of linear displacement per revolution, the total rotation value is converted to revolutions then multiplied by the gearing ratio. Alternatively, if the gearing ratio is given in terms of linear displacement per bit, the total rotation value is simply multiplied by the gearing ratio. For example, if the gearing ratio were 0.00001 inches per bit, the resolver output of 147,452 could be scaled to a linear equivalent of 1.4745 inches (0.00001×147,452). This number indicates the distance which the motor would be expected to move the associated machine element in 4.5 revolutions, and can be added to or subtracted from a resolver offset value to calculate the linear position. The linear distance should be added to the offset value if the motor is rotating in what is considered the forward direction, and it should be subtracted to the offset value if the motor is rotating in the reverse direction.

At power up of the machine control, the resolver offset value should be set equal to the actual position of the machine element for the axis being monitored, as sensed by the linear position transducer connected to that element, such as the transducer 132 for the clamp unit 100. This is needed because, unlike the linear position transducer, the resolver is not an absolute measuring device and requires a reference from which to begin adding or subtracting the scaled resolver output to calculate the linear position in step 26. Once the resolver offset value is initialized, rotation of the motor causes the resolver to generate a signal, which is scaled using the gearing ratio and is added or subtracted to the resolver offset value (depending on the direction of rotation) to determine the linear position of the machine element, as described above.

The axis position calculated at step 26 indicates the expected position of the associated machine element and, as described below, can be used to verify that the actual axis position is correct. (However, other means of determining the expected position of the element can be used without departing from the scope of the invention, such as, for example, by using an additional transducer on an element of the axis being monitored.)

Once the transducer signal is received and the linear position is calculated, step 28 is executed. At step 28, the difference between the actual axis position (as indicated by the transducer signal) and the expected axis position (as calculated in step 26) is determined. This difference is compared to a predetermined tolerance value, at step 30. The tolerance value can be defined by the user of the method prior to execution, and indicates the amount which the calculated axis position will be allowed to differ from the measured axis position without the counter being decremented. As can be understood, a smaller tolerance value will permit less deviation between the two values before decrementing the counter than will a larger tolerance value.

If it is determined at step 30 that the difference between the calculated position and the actual position does not exceed the tolerance value, then step 16 is executed and the counter is reset to the counter reset value. The reset value determines the number of iterations of the method during which the difference between the calculated position and the actual position will be permitted to exceed the tolerance value, without an error signal or signals being generated, and thereby controls the amount of time that the error condition will be allowed to persist. Thus, the greater the reset value, the longer the two positions will be permitted to remain in error. After step 16, the iteration of the method is ended at step 34. (However, the method should be executed again later to ensure continuous monitoring. Preferably, the method is executed every 1 millisecond.)

If, however, it is determined at step 30 that the difference between the calculated position and the actual position does exceed the predetermined tolerance value, then step 32 is executed and the counter is decremented (e.g., by the statement "Counter=Counter−1"). The method is then terminated at step 34.

As noted above, it is determined at step 18 whether the counter has reached zero. If it has, then it is known that the difference between the calculated position (indicating the expected axis position) and the actual axis position (as indicated by the transducer) has been greater than the predetermined error limit for a sufficient number of iterations to allow the counter to be decremented to zero. Accordingly, if step 18 is answered in the affirmative, step 20 is executed wherein an error signal is generated which deactivates the motor driving the monitored axis, sets the velocity command equal to zero and reports the error to the operator, such as through an audiovisual alarm generated at the operator console. This deactivation of the motor can include electronic or mechanical braking of the motor, as is known in the industry, to ensure immediate termination of the aberrant operation. It should be understood that the error signal or signals which are generated at step 20 can perform other functions in addition to, or as an alternative to, stopping the motor of the problematic axis and sounding an alarm. For example, the error signal or signals could deactivate all of the motors in the machine, and not just the particular motor driving the axis being monitored by the method.

Accordingly, the method illustrated in the flow diagram of FIG. 2 can detect an aberrant machine condition wherein the expected axis position, as can be calculated from the rotation of the motor shaft and the gearing ratio, deviates from the measured axis position, as sensed by the linear displacement device on an element of the relevant machine axis. The method can warn the operator of the aberrant condition and stop the motor before undesirable performance or damage occurs. Preferably, in a machine having a plurality of motor drives, such as the injection molding machine illustrated in FIG. 1, the required sensors are provided on each motor and a suitable machine element for each axis, and the method is used to monitor operation of all axes. The embodiment depicted in FIG. 2 also verifies that the output of each linear position device is correct.

The exact cause of the aberrant condition detected by the method of FIG. 2 will vary and can generally be determined by the operator once the machine has been shut down. For example, the transducer and/or resolver could be disconnected, loose, or broken. The drive belt connecting the motor to the ball screw could be loose, damaged or broken, or may have jumped teeth. Also, the ball screw itself could be loose or damaged. Alternatively, the setup values required for the method could have been erroneously entered by the operator of the machine. For example, in the case of an injection molding machine, the operator could have entered an incorrect setpoint, such as an incorrect eject setpoint, thereby causing the ball screw timing to jump.

Figure 3:
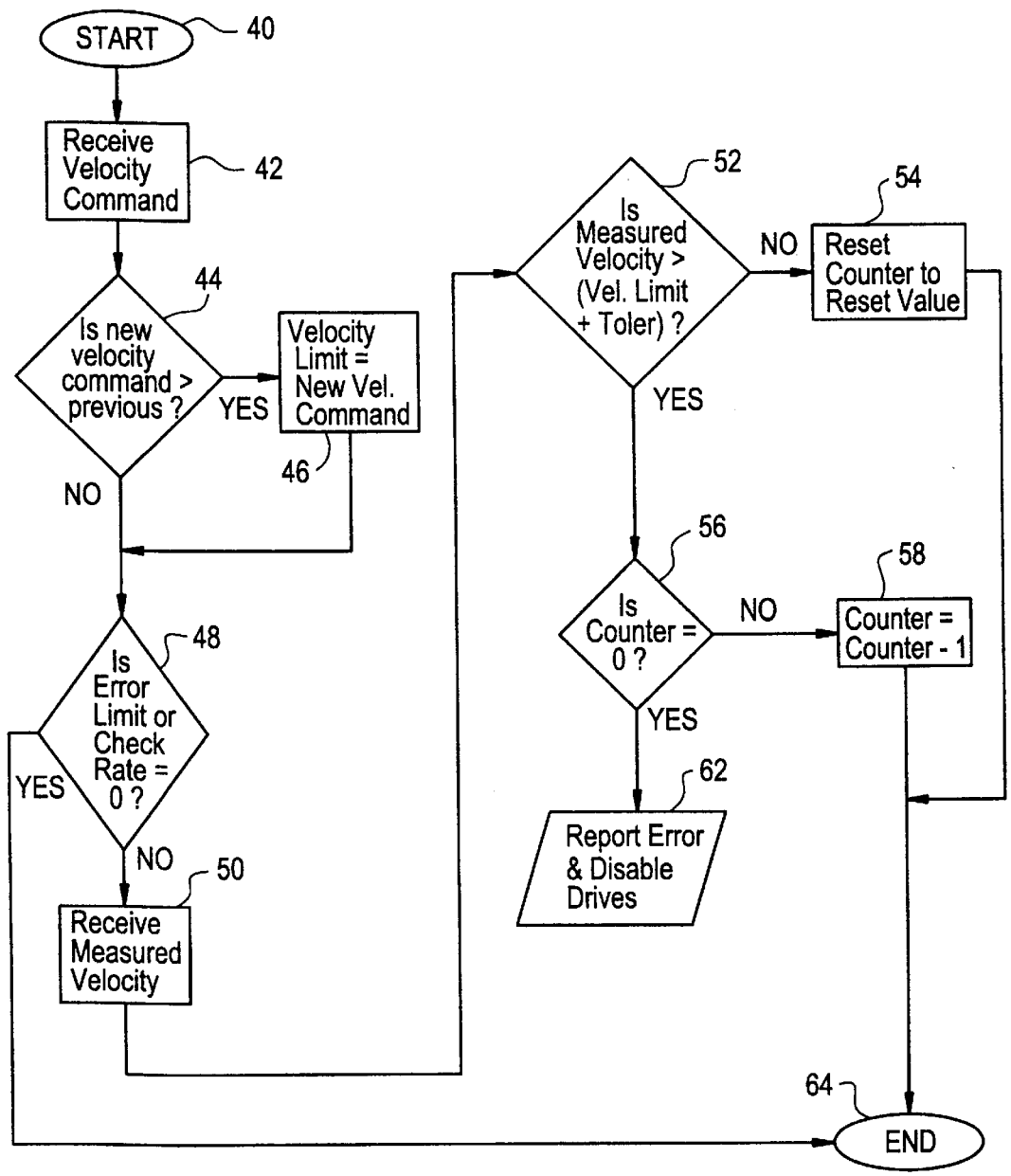
FIG. 3 is a flow diagram illustrating a method for monitoring the velocity of a motor and reporting an error condition when the motor velocity exceeds a velocity limit which can change in accordance with changes in motor command signals, in accordance with another aspect of the present invention.

Preferably, the method illustrated in FIG. 2 is used with a control system and method of detecting motor runaway, such as the method depicted in the exemplary flow diagram of FIG. 3. However, the methods of FIG. 2 or FIG. 3 could operate independently without departing from the scope of this invention.

The method illustrated in the flow diagram of FIG. 3 ensures that the motor velocity, as calculated from the resolver signal, does not exceed a maximum value (also known as a "clamp" value), which can vary depending upon the velocity commands provided to the motor. The method of FIG. 3 follows the preferred operation of the velocity command alarm 196 of FIG. 1 and is initiated at step 40. Preferably this method is executed periodically, such as every 1 millisecond for example, until an error is detected and the drive is deactivated, or until machine operation has ended successfully. At step 42, the velocity command that is being or will be delivered to the motor is received. In the representative application of FIG. 1, the velocity command is generated automatically by the machine control 190 according to the desired operating sequence of the injection molding machine. However, it is contemplated that manual velocity commands can be entered as well.

Once the new velocity command is received at step 42, it is then compared, at step 44, to the previous velocity command which was saved during the previous iteration. The previous velocity command can be initialized to zero during the first iteration of the method. If the new velocity command is greater than the previous velocity command, step 46 is executed and the velocity limit is set equal to the new velocity command. (The velocity limit can also be set equal to zero for the first iteration.)

Then, at step 48, it is determined whether either the error limit or the counter reset value (or "check rate") has been set equal to zero. If either of these variables has been set equal to zero by the user of the machine, the algorithm is considered deactivated, and the method is ended, at step 64. It should be understood that other methods of checking whether the algorithm is enabled can be utilized as an alternative to step 48, such as, for example, by utilizing an enablement bit which, when set to zero, deactivates the method.

However, if neither value is equal to zero, the method proceeds to step 50, wherein the velocity measured by the motor resolver is received. As is known in the art, the resolver (or computing device associated with the resolver) can calculate the motor velocity from the present motor position, a previously measured motor position, and the time between the two measurements. For example, if the resolver signal is equal to 1 revolution at time t0 and the resolver signal is equal to 1.1 revolutions one millisecond later at time $t_1$, the motor velocity would be 0.1 revolutions per millisecond or 6000 revolutions per minute (RPM). In other words, the velocity is equal to the present motor position minus the previous motor position, divided by the time elapsed between the two measurements. Preferably, for an accurate calculation of the motor velocity, the time elapsed between the two measurements is kept as small as possible.

As can be understood, other tachometers, pulse encoders, or other velocity sensors can be used as an alternative to the resolver on the motor shaft, and may be preferred in other applications of the present invention.

Once the motor velocity is measured and received (step 50), it can be compared to the velocity limit at step 52 to determine if the motor is "running away." During this step, the measured velocity is compared to the velocity limit plus a tolerance value which can be provided by the user of the method. If the measured velocity does not exceed the velocity limit plus the tolerance, then the counter is reset to the counter reset value at step 54, and the routine is ended at step 64. However, if the measured velocity does exceed the velocity limit plus the error limit the motor is "running away." Accordingly, step 56 is executed to determine whether the counter is equal to zero, meaning that the motor has been running away for the maximum allowable time, as defined by the counter reset value. If the counter is equal to zero, then runaway has occurred for the maximum time period and step 62 is executed, wherein an error signal or signals are generated to report the error to the machine operator and to deactivate the runaway motor. If, however, the counter has not yet reached zero, then step 58 is executed wherein the counter is decremented and the routine is ended.

Thus, according to the representative embodiment of FIG. 3, the velocity command alarm method and control system of the present invention preferably compares the measured motor velocity to a limit which is determined by the previous velocity commands fed to the motor (plus a tolerance value), the motor is deactivated and the velocity command set equal to zero when the motor velocity exceeds the limit for a given amount of time. As indicated previously, deactivation of the motor can include electronic or mechanical braking of the motor to ensure appropriate and timely termination of machine operation.

Figure 4:
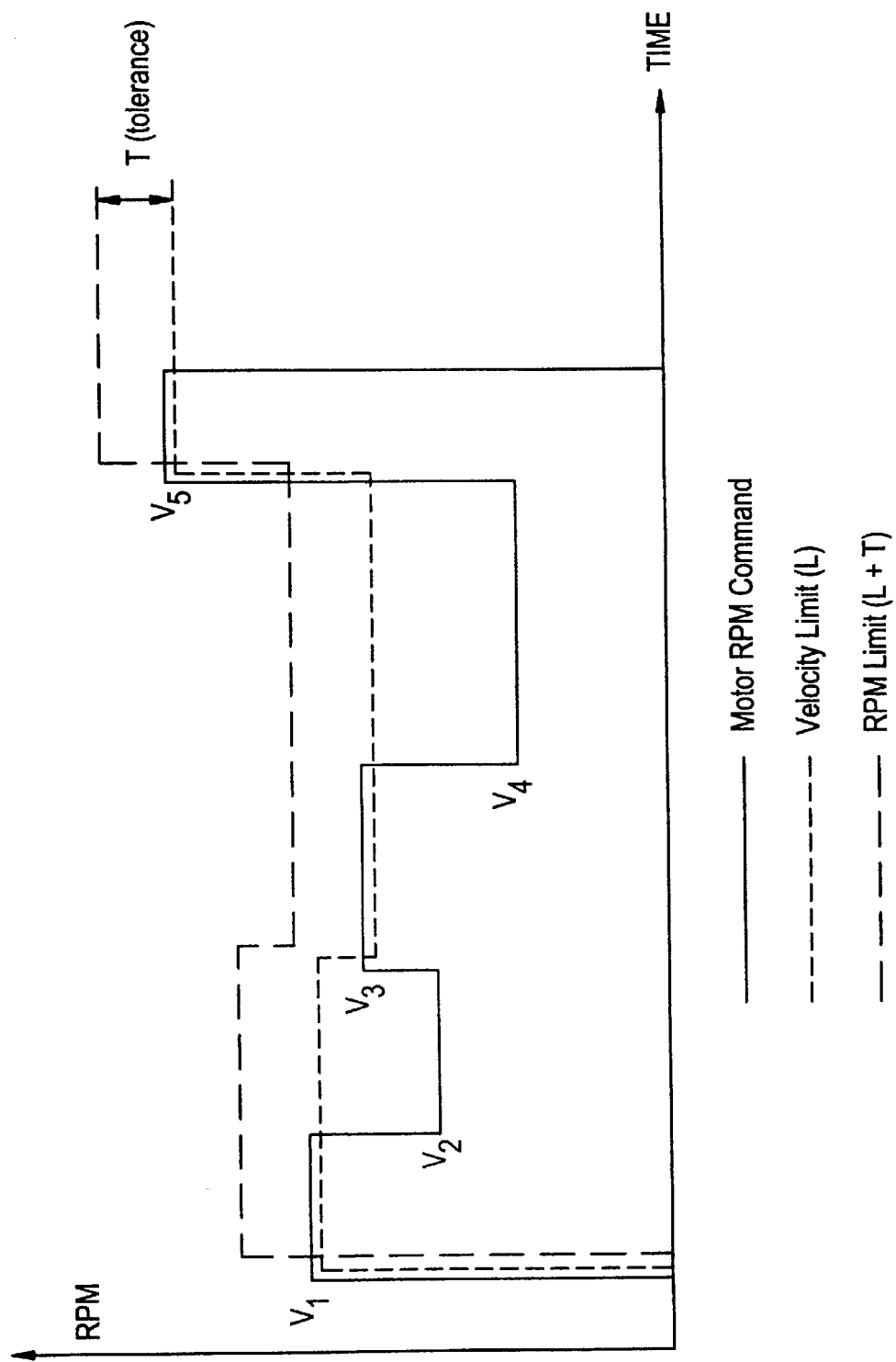
FIG. 4 is a graph illustrating the movement of an exemplary motor velocity limit envelope in accordance with the velocity command, (wherein each function is shown slightly offset for clarity), such as could be provided by the method shown in FIG. 3.

As shown in the graph of FIG. 4, according to the method of FIG. 3, the velocity limit (shown as a dotted line) changes whenever the velocity command (shown as a solid line) being fed to the motor exceeds the previous velocity command supplied to the motor, which was saved during the previous iteration of the method (or at some other earlier time). As shown in FIG. 4, the velocity limit rises whenever the new velocity command exceeds the previous command, but does not immediately decrease when the new velocity command falls below the previous command. Rather, the limit does not change until the command supplied to the motor exceeds the previous command, at which time the limit will be changed to be equal to the new command. However, as shown in the graph, it is possible for there to be a reduction in the velocity limit where $V_n > V_{n+1} < V_{n+2} < V_n$. In this case, the velocity limit is first set at $V_1$; it does not change when the $V_2$ command is given (since $V_2 < V_1$), but drops to $V_3$ when that command is issued (since $V_3 > V_2$). It should be noted that the total RPM limit shown in FIG. 4, against which the measured motor velocity is compared, is equal to the velocity limit L plus the tolerance value T, so that a given amount of motor velocity error can be tolerated.

Figure 5:
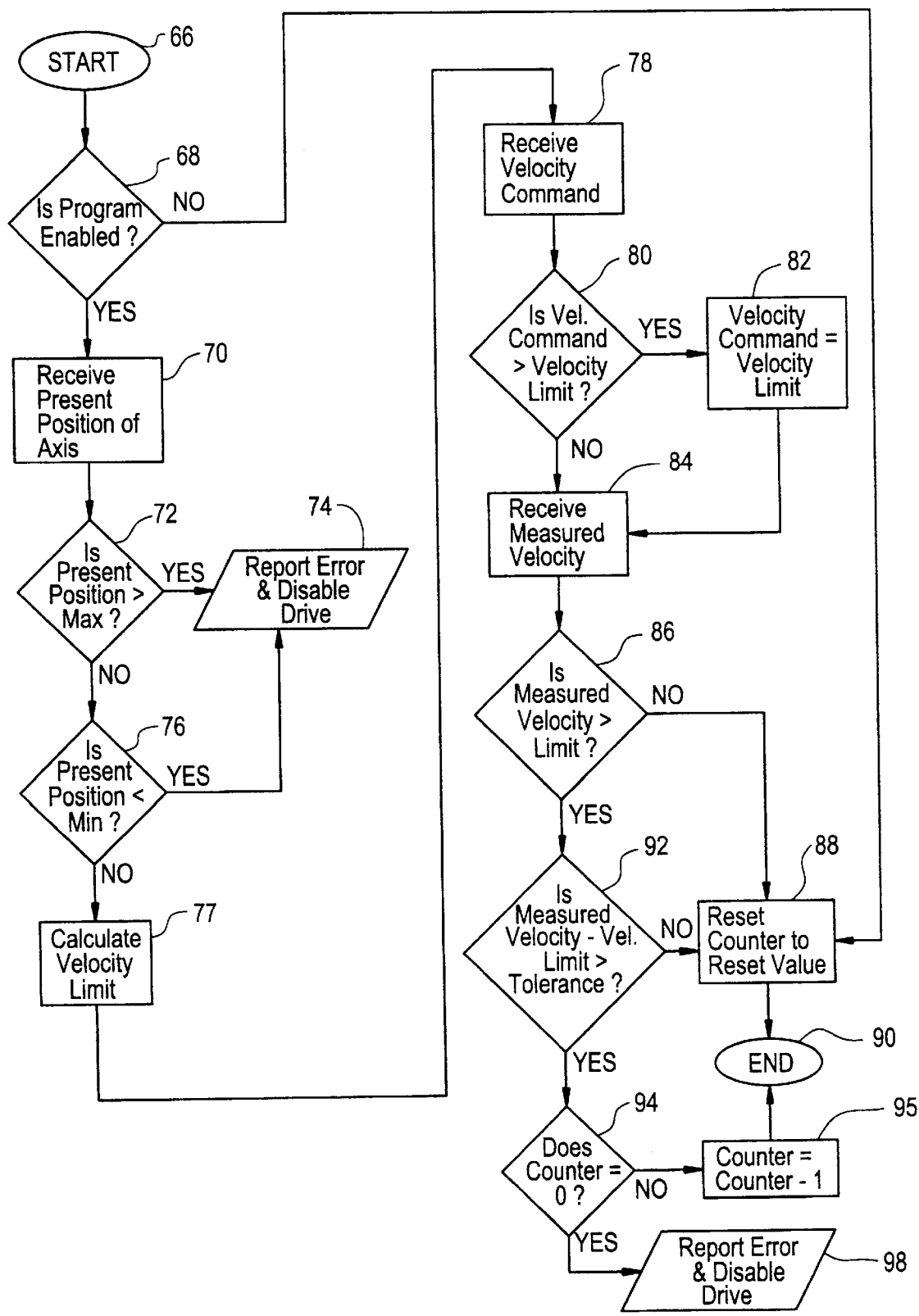
FIG. 5 is a flow diagram illustrating a method for monitoring the velocity of a motor and reporting an error condition when the velocity exceeds a predetermined velocity limit that varies with the position of machine elements in the driven axis, in accordance with another aspect of the present invention.

Turning now to FIG. 5, an additional velocity alarm embodiment is provided, which can be used either in conjunction with the axis position alarm 194 and/or the velocity command alarm 196 described above, or that can be used by itself to monitor runaway motor conditions. The velocity envelope alarm 198 of FIG. 1 preferably operates according to the flow diagram of FIG. 5. The control system monitors the motor velocity and ensures that the velocity does not exceed a limit that is dependent on the position of the machine element being driven by the motor. The method begins at step 66 and is preferably executed periodically during machine operation, such as every 1 millisecond, for example.

At step 68, it is determined whether the program has been enabled by the user. As noted above, a variety of methods can be used to allow the user to deactivate the program. For example, the user can deactivate the program by setting a variable or variables equal to zero during setup of the program.

If the user has deactivated the program, control proceeds to step 88, where the counter is reset to the counter reset value, which is definable by the user during setup. Similar to the reset values discussed above, this value determines the number of consecutive iterations of the program during which the error condition is permitted to persist without an error signal being generated to report the error and/or deactivate the drive. After step 88, the method is ended at step 90.

If it is determined at step 68 that the user has enabled the program, then control proceeds to step 70 wherein the present position of the machine element of the monitored axis is received. This position can be measured by a linear position device such as a magnetostrictive linear displacement transducer or a linear displacement potentiometer, for example. At step 72 and 76, the position of the driven element of the axis is compared to a maximum allowable position and a minimum allowable position. These position limits are also definable by the user according to the particular machine with which the program is used and/or the particular use and application of the machine. For example, in the case of the injection platen 146 of the injection molding machine of FIG. 1, the limits should be set so that the platen does not move too far forward toward the front stationary member 144, nor too far backward toward the rear stationary member 154. As can be understood, if the injection platen 146 were to move too close to either stationary member 144 or stationary member 154, other parts of the machine could be damaged, such as the extruder screw 142, the ball screw 158 or the ball nut 162, by coming into contact with other machine elements.

Thus, if the present position of the machine element for the axis being monitored is greater than the maximum allowable position, as determined at step 72, or less than the minimum allowable position, as determined at step 76, step 74 will be executed, wherein the error will be reported to the operator of the machine, and the drive which is moving the machine element for that axis will be deactivated. Other error signals and alarms can also be used in conjunction with or as an alternative to those described in step 74.

Figure 6A:
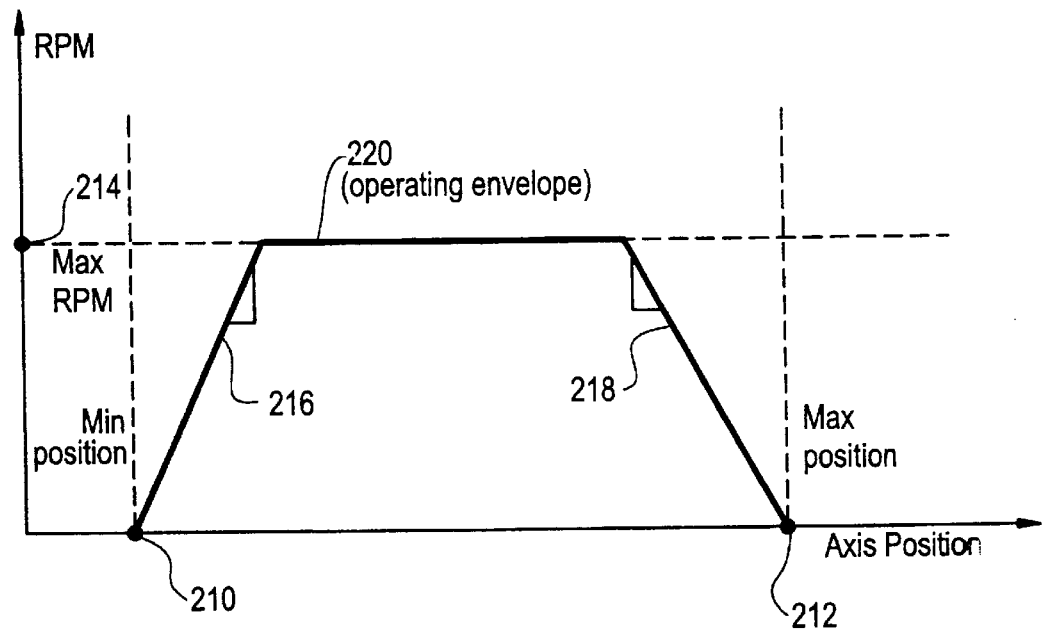
FIG. 6a and FIG. 6b illustrate two operating envelopes which can be used with the method shown in FIG. 5 to define a motor velocity limit for a given position of an element of the driven axis, against which a measured motor velocity will be compared.
Figure 6B:
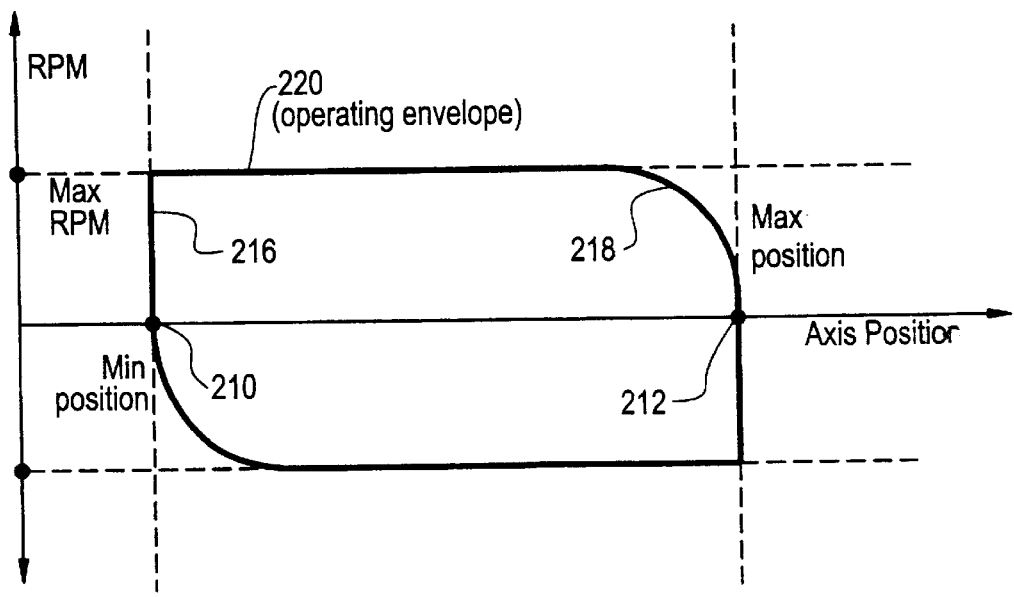

If the present position of the machine element is within the allowable range, as defined by the maximum and minimum limits, the method proceeds to step 77, wherein the velocity limit (the maximum velocity allowable for the motor for the present axis position) is determined according to the desired operating envelope for the motor. The desired envelope can be achieved solely from data provided when the program is setup for the particular machine with which it will be used. For example, as shown in FIG. 6a and 6b, the user can define a minimum allowable position 210 (also known as the minimum stroke), a maximum allowable position 212 (maximum stroke), the maximum RPM which the motor will be allowed to reach 214, and a gain (or slope) to be used for ramp 216 and ramp 218. The user can also indicate whether the envelope will be a linear function, as in FIG. 6a, or a parabolic function, as in FIG. 6b, and whether the curve should be mirrored for both positive and negative motor velocities, as shown for the exemplary envelope in FIG. 6b.

From this data, the control system can determine a velocity limit for any measured position for a given element of a machine axis and thereby obtain any point on the operating envelope 220, as is known in the art of curve calculation and determination, and as more fully described below with respect to FIG. 7.

Once the velocity limit has been obtained at step 77 from the user data, the velocity limit can be compared to the measured velocity of the motor as well as the velocity command being sent to the motor. At step 78, the velocity command which is being fed to the motor is received. Then, at block 80, the velocity command is compared to the velocity limit to determine if the command exceeds the velocity limit. If the command does exceed the velocity limit, then step 82 is executed wherein the velocity command is set equal to the velocity limit value, thereby clamping the velocity command to the operating envelope, and ensuring that the commanded velocity does not exceed the velocities allowed by the envelope. Then, step 84 is executed wherein the actual motor velocity is detected, such as by a resolver, and received.

If, on the other hand, the velocity command does not exceed the velocity limit, step 82 is bypassed and the commanded velocity need not be clamped to the envelope. The method proceeds to step 84 and the measured motor velocity is received. Once the measured velocity has been received, it can be compared to the velocity limit, at step 86. If the measured motor velocity does not exceed the motor limit, then step 88 is executed and the counter is reset to the counter reset value. The method is then ended at step 90.

However, if it is determined at step 86 that the actual velocity does exceed the velocity limit, then control proceeds to step 92, wherein the difference between the measured velocity and the limit is compared to a predetermined or user definable tolerance value. If the measured velocity minus the velocity limit is within the tolerance, then the counter is reset to the reset value at step 88 and the method is ended at step 90.

If the difference between the measured motor velocity and the velocity limit does exceed the tolerance, as determined at step 92, then the method proceeds to check whether the counter has reached zero, at step 94. If the counter has reached zero, then the error is reported, the runaway motor is deactivated and the velocity command set equal to zero (step 98). If the counter has not reached zero, the counter is decremented at step 95 and the method is ended (step 90).

Accordingly, the method of FIG. 5 monitors the velocity of the motor and the position of an element of the driven axis, and provides an error signal when the motor velocity exceeds a velocity limit which is dependent upon that element's position. Consequently, the motor can be forced to operate more slowly as the elements of the axis approach other machine components or areas where the damage risk is greater, and can be allowed to operate at faster speeds when the driven elements are located in less hazardous territory. As more fully explained below, the operating envelope for the motor is user definable for the particular motor application, and can be obtained by entering a relatively small amount of data which describes the desired envelope characteristics. The method also provides an error signal when the measured element position falls outside of the allowable range.

The velocity errors detected by the methods of FIG. 3 and FIG. 5 can be caused by a number of sources. For example, the motor, its electrical connections with the machine control, or its coupling to the driven elements could be damaged or faulty. Also, the machine control software and control devices could be operating improperly.

The calculation of the velocity limit at step 77 of FIG. 5 can be achieved in a variety of manners. For example, consider the case where the user of the program wishes it to control a machine with an operating envelope similar to that of FIG. 6a. Also, further assume that, for this particular machine, the minimum allowable position is 2, slope is 5, the maximum position is 10, and the maximum RPM is 10. At setup, this data would be entered into the machine, along with an indication that the envelope is to be linear. Thus, from this data, the following four points are known: (2,0), (4,10), (8,10), and (10,0), and it is known that linear functions exist between these points.

Accordingly, a routine can be written whereby whenever the present position of a machine element, detected in step 70, is between 4 and 8, the maximum allowable velocity of the motor (the velocity limit) is set to 10.

On the other hand, whenever the position of the element is between 2 and 4, the routine would calculate the limit from the linear equation:

$$y=mx+b,$$

where y is the velocity limit, x is the present position of the element, m is the slope, and b is the offset calculated from the points provided. (In the example, the value of "b" in the equation can be obtained by entering the point (2,0) into the equation y=5x+b, thereby obtaining a value of −10 for b. ) Thus, in the example, if the position of the element were 3, the velocity limit would be calculated to be 5. The same procedure can be used for positions which are between 8 and 10, only the slope will be negative. Although this example uses a slope of 5 for the ramp 216 where the motor comes up to speed, in many cases it would be desirable for the line 216 to be vertical (infinite slope). This means that the motor is brought up to speed as quickly as possible when the risk of damage is low (more clearance).

Other mathematically equivalent methods can be used to determine the velocity limit for a linear envelope such as that of FIG. 6a. For example, the program can take the present position, subtract the minimum allowable position 210 (which was provided at setup) and multiply the result by the slope to get a first velocity value. The program can then subtract the present position from the maximum allowable position 212 (also provided at setup) and multiply the difference by the slope to get a second velocity value. Then, the lower of the first velocity value, the second velocity value and the maximum velocity 214 (also established at setup) can be used as the velocity limit.

If the desired operating envelope is parabolic, as in FIG. 6b, a similar method can be used, except that a square root function needs to be included to obtain the parabolic (i.e., second power exponential) characteristic. According to this parabolic method, if the previously measured velocity is greater than zero, then the square root of the difference between the present position of the element and the maximum position 212 is obtained, and the result is multiplied by the slope to obtain a velocity value. This velocity value is then compared with the maximum velocity 210, and the lower of the two is used as the envelope velocity limit for the present position. If the previously measured velocity is less than zero, then the lower half of the envelope is to be obtained. Accordingly, the minimum position 210 is subtracted from the present position, the square root of the difference is obtained, and the result is multiplied by the gain. Thus, as with the linear function, the slope, the maximum position 212, the minimum position 210, and the maximum velocity 214 must be established at setup for the desired envelope characteristic. (For the points provided in the example above, the required slope would be 7.07 to obtain parabolic function of FIG. 6*a*.)

Figure 7:
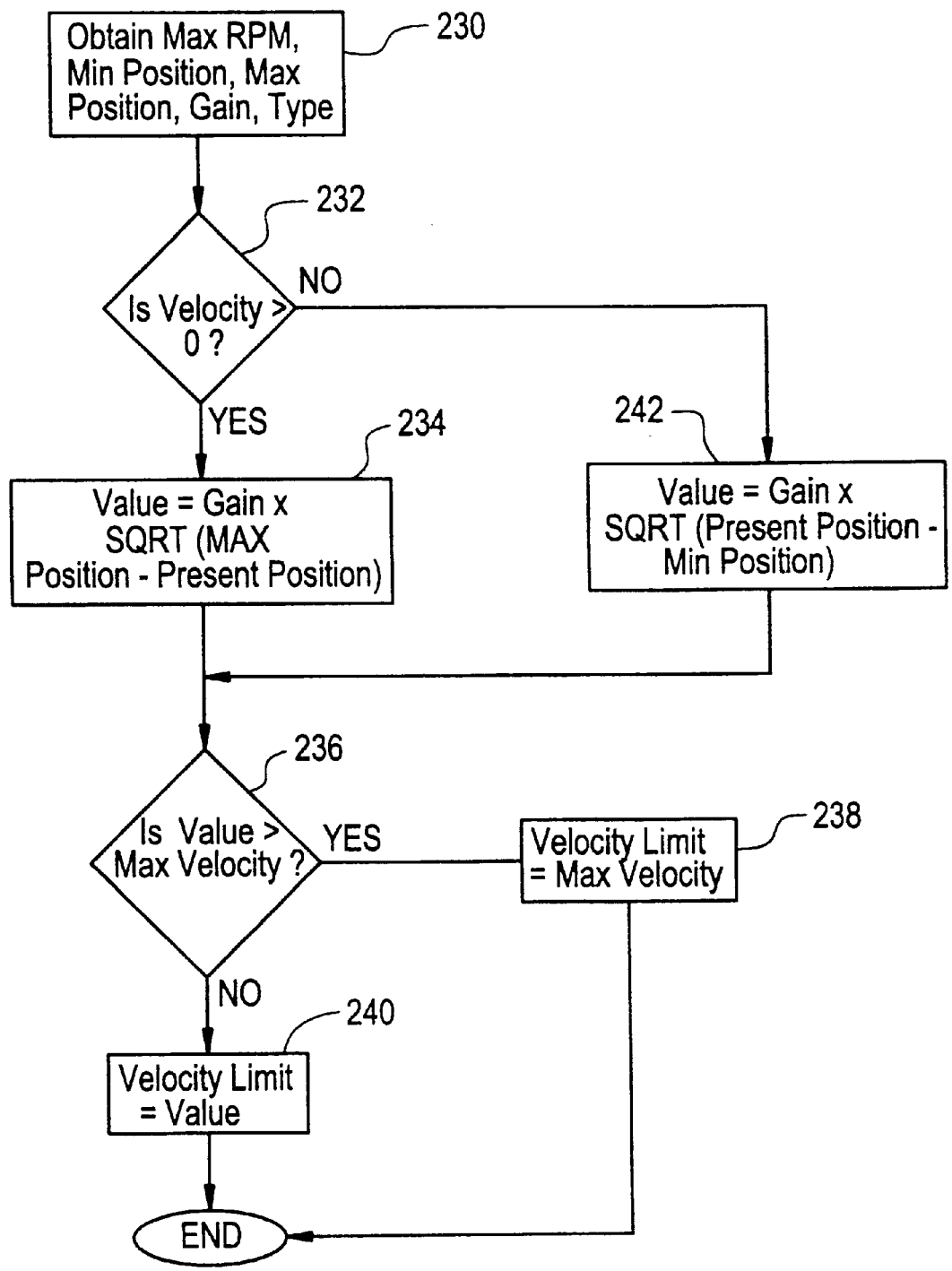
FIG. 7 illustrates a method for calculating a velocity limit which follows the operating envelope of FIG. 6b, in accordance with another aspect of the present invention.

FIG. 7 is a flow diagram indicating this particular method of calculating the velocity limit for a parabolic operating envelope, and therefore illustrates the steps which could be performed to carry out step 77 of FIG. 5. At step 230 of FIG. 7, the operating envelope parameters are obtained from the user at setup of the program for the particular application. These parameters are the maximum motor velocity, the minimum position of the element, the maximum position of the element, the gain for the curve, and the curve type. In the case of a parabolic type, the user would indicate that a parabolic curve is desired, such as by setting a register accordingly. Then, at step 232, it is determined whether the velocity of the motor is greater than zero. If the velocity is greater than zero, then a value is calculated at step 234 by multiplying the gain by the square root of the difference between the maximum position and the present position. However, if the velocity is not greater than zero, the value is calculated by multiplying the gain by the square root of the difference between the present position and the minimum position.

Once the value is calculated, it is compared to the maximum motor velocity, at step 236. If the value is greater than the maximum velocity, then the velocity limit is set to be equal to the maximum velocity, at step 238, and the method is ended. If the value is less than the maximum velocity, then the velocity limit is set to be equal to the value, at step 240, and the method is ended.

Thus, FIG. 7 depicts one method of obtaining a velocity limit for the detected position of the machine element of the axis being monitored, and for achieving the operating envelope depicted in FIG. 6*b*. This method can serve as step 77 of FIG. 5, if a parabolic envelope is desired. It will be apparent that the method shown in FIG. 7 can also be used to provide a linear envelope. The only change would be in the calculation steps 234 and 242. Specifically, the SQRT function is eliminated so that the "value" equals the gain multiplied by the difference between the present position and the relevant max/min position.

Accordingly, various curve calculation/estimation procedures can be used to determine the velocity limit points which define the operating envelope, such as the envelopes shown in FIG. 6*a* and FIG. 6*b*. As shown by the above description, a variety of operating envelope shapes and characteristics can be obtained by these procedures. As was also shown above, the velocity limit can be determined "on the fly" for the present position of the driven element from data entered by the user at setup. However, it is contemplated that other methods could be used to obtain the velocity limit and thereby achieve the desired operating envelope characteristic. One such alternative would be to use "look-up" tables having the operating envelope data contained therein, whereby the program could "look-up" the velocity limit for any position measured, or interpolate a velocity limit from the existing data in the table.

The alarm systems 194, 196, and 198 of the present invention, as well as the corresponding methods illustrated in the exemplary flow diagrams of FIG. 2, FIG. 3, and FIG. 5, are preferably embodied in firmware in the machine control 190 of FIG. 1, the firmware having a computer program or programs encoded thereon. It is also preferred that the code for the firmware is written in the Assembly programming language. However, it is to be understood that the control systems and methods can be embodied in other devices and circuitry without departing from the scope of the invention. For example, the control systems and methods can be embodied in a variety of computer readable medium (e.g. hard disk or CD-ROM), and can be implemented in a variety of programming languages (e.g., C, C++, or Basic) without departing from the scope of the invention. Such programs may take on a number of forms and arrangements, utilize a variety of variable names and commands (such as input statements, output statements, decision statements, assignment statements, loops, variables, arrays, and/or other statements and techniques), without departing from the scope of the invention. Moreover, the methods and control systems can be used in any combination or can be used independently, and can be applied to a variety of machines and systems utilizing a motor and an axis driven by the motor, such as machine tool system or an extruder for example. Furthermore, each of the various axes described above could comprise any number of machine elements, parts, or devices to be moved or driven by the motor, and whose position is capable of being measured by a sensor. It should also be noted that the tolerance values and counter reset values described herein could be set to zero without departing from the invention.

The foregoing description of preferred embodiments of the invention have been presented for purposes of illustration and description. It not intended to be exhaustive or to limit the invention to the precise form disclosed. Modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A control system for detecting an aberrant velocity of a motor used to drive an element in a machine, comprising:

a first sensor positioned to measure the velocity of a motor used to drive an element in a machine;

a machine control device adapted to generate a velocity command for controlling the velocity of the motor;

a velocity limit determination unit adapted to receive the velocity command, compare the command to a previous velocity command provided by the machine control device, and determine a velocity limit based upon the comparison, wherein the velocity limit is set equal to the velocity command if the velocity command exceeds the previous velocity command; and a velocity monitor adapted to receive the measured velocity and compare the measured velocity to the velocity limit, wherein the monitor generates an error signal when the measured velocity exceeds the velocity limit by more than a predetermined tolerance value.

2. The control system as recited in claim 1, further comprising:

a storage element adapted to store the previous velocity command provided by the machine control device;

a counter, wherein the monitor activates the counter when the measured velocity exceeds the velocity limit by more than the tolerance value, and wherein the monitor resets the counter when the measured velocity does not exceed the velocity limit by more than the tolerance value, wherein the error signal is generated when the counter reaches a predetermined value.

3. The control system as recited in claim 1, further comprising a motor disabling device adapted to react to the error signal to disable the motor.

4. The control system as recited in claim 1, wherein the machine comprises an injection molding machine, the motor comprises a DC brushless motor, and the sensor comprises a resolver.

5. A control system for detecting an aberrant velocity of a motor used to drive an element in a machine, comprising:
   a first sensor positioned to measure the velocity of the motor used to drive the element along an axis in the machine;
   a second sensor positioned to measure the linear position of the element;
   a velocity limit determination unit adapted to receive the measured position and to determine a velocity limit based upon the measured position, including a calculation unit adapted to receive a maximum motor velocity value, a maximum element position value, a minimum element position value, and a gain value, and to determine the velocity limit from the values received and the measured position of the element; and
   a velocity monitor adapted to receive the measured velocity and to compare the measured velocity to the velocity limit, wherein the monitor generates an error signal when the measured velocity exceeds the velocity limit by more than a predetermined tolerance value.

6. The control system as recited in claim 5, wherein the values received define a limiting velocity operating envelope.

7. The control system as recited in claim 5, further comprising:
   an element position monitor adapted to generate an error signal when the element position is greater than a maximum element position or less than a minimum element position.

8. The control system as recited in claim 5, further comprising:
   a machine control device in communication with the motor for generating a velocity command for controlling the motor velocity; and
   a velocity command monitor adapted to receive the velocity command and to compare the command to the velocity limit, wherein the velocity command is set equal to the velocity limit when the velocity command is greater than the velocity limit.

9. A control system for detecting an aberrant velocity of a motor used to drive an element in a machine, comprising:
   a first sensor positioned to measure the velocity of the motor used to drive the element along an axis in the machine;
   a second sensor positioned to measure the linear position of the element;
   a velocity limit determination unit adapted to receive the measured position and to determine a velocity limit based upon the measured position; and
   a velocity monitor adapted to receive the measured velocity and to compare the measured velocity to the velocity limit, including a counter, wherein the monitor activates the counter when the measured velocity exceeds the velocity limit by more than a tolerance value, and wherein the monitor resets the counter when the measured velocity does not exceed the velocity limit by more than the tolerance value, wherein an error signal is generated when the counter reaches a predetermined value.

10. The control system as recited in claim 9, further comprising:
    a machine control device in communication with the motor for generating a velocity command for controlling the motor velocity; and
    a velocity command monitor adapted to receive the velocity command and to compare the command to the velocity limit, wherein the velocity command is set equal to the velocity limit when the velocity command is greater than the velocity limit.

11. A control system for detecting an aberrant velocity of a DC brushless motor used to drive an element in an injection molding machine, comprising:
    a first sensor positioned to measure the velocity of the DC brushless motor used to drive the element along an axis in the injection molding machine;
    a second sensor positioned to measure the linear position of the element;
    a velocity limit determination unit adapted to receive the measured position and to determine a velocity limit based upon the measured position; and
    a velocity monitor adapted to receive the measured velocity and to compare the measured velocity to the velocity limit, wherein the monitor generates an error signal when the measured velocity exceeds the velocity limit by more than a predetermined tolerance value.

12. The control system as recited in claim 11, wherein the first sensor comprises a resolver.

13. The control system as recited in claim 11, wherein the second sensor comprises a linear displacement transducer.

14. The control system as recited in claim 11, further comprising a motor disabling device adapted to react to the error signal and to disable the DC brushless motor.

15. The control system as recited in claim 11, further comprising:
    an element position monitor adapted to generate an error signal when the element position is greater than a maximum element position or less than a minimum element position.

16. A control system for detecting an aberrant velocity of a motor used to drive an element in a machine, comprising:
    a first sensor positioned to measure the velocity of the motor used to drive the element along an axis in the machine;
    a second sensor positioned to measure the linear position of the element;
    a velocity limit determination unit adapted to receive the measured position and to determine a velocity limit based upon the measured position;
    a machine control device in communication with the motor for generating a velocity command for controlling the motor velocity;
    a velocity command monitor adapted to receive the velocity command and to compare the command to the velocity limit, wherein the velocity command is set equal to the velocity limit when the velocity command is greater than the velocity limit; and
    a velocity monitor adapted to receive the measured velocity and to compare the measured velocity to the velocity limit, wherein the monitor generates an error signal when the measured velocity exceeds the velocity limit by more than a predetermined tolerance value.

17. A method for detecting an aberrant motor velocity of a motor used to drive an element in a machine, comprising the steps of:

measuring the velocity of the motor;

measuring the position of the element driven by the motor;

determining a velocity limit based upon the measured element position, a minimum element position value, a maximum element position value, a maximum motor velocity value, and a slope value; and generating an error signal when the motor velocity exceeds the velocity limit by more than a predetermined tolerance value.

18. The method as recited in claim 17, wherein the step of generating an error signal comprises the steps of:

activating a counter when the measured velocity exceeds the velocity limit by more than the tolerance value; and resetting the counter when the measured velocity does not exceed the velocity limit by more than the tolerance value, wherein the error signal is generated when the counter reaches a predetermined value.

19. The method as recited in claim 17, further comprising:

generating a second error signal when the measured element position exceeds the maximum element position value or is less than the minimum element position value.

20. A method for detecting an aberrant motor velocity of a motor used to drive an element in a machine, comprising the steps of:

measuring the velocity of the motor;

measuring the position of the element driven by the motor;

determining a velocity limit based upon the measured element position;

providing a motor velocity command;

setting the motor velocity command equal to the velocity limit when the motor velocity command exceeds the velocity limit; and generating an error signal when the motor velocity exceeds the velocity limit by more than a predetermined tolerance value.

21. A method for detecting an aberrant motor velocity of a motor used to drive an element in a machine, comprising the steps of:

measuring the velocity of the motor;

providing a motor velocity command;

determining a velocity limit by storing the previous velocity command provided to the motor, comparing the motor velocity command to the previous velocity command, and setting the velocity limit equal to the motor velocity command if the motor velocity command exceeds the previous velocity command; and generating an error signal when the motor velocity exceeds the velocity limit by more than a predetermined tolerance value.

22. A method for detecting an aberrant motor velocity of a brushless DC motor used to drive an element in an injection molding machine, comprising the steps of:

measuring the velocity of the brushless DC motor using a resolver;

providing a machine parameter associated with the operation of the machine;

determining a velocity limit based upon the machine parameter; and generating an error signal when the motor velocity exceeds the velocity limit by more than a predetermined tolerance value.

23. The method as recited in claim 22, further comprising the step of disabling the motor in response to the error signal generated.

24. A method for detecting an aberrant motor velocity of a motor used to drive an element in a machine, comprising the steps of:

measuring the velocity of the motor;

providing a machine parameter associated with the operation of the machine;

determining a velocity limit based upon the machine parameter; and generating an error signal when the motor velocity exceeds the velocity limit by more than a predetermined tolerance value by activating a counter when the measured velocity exceeds the velocity limit by more than the tolerance value and resetting the counter when the measured velocity does not exceed the velocity limit by more than the tolerance value, wherein the error signal is generated when the counter reaches a predetermined value.

\* \* \* \* \*